United States Patent
Ragsdale et al.

(10) Patent No.: US 10,560,416 B2
(45) Date of Patent: *Feb. 11, 2020

(54) HERO CARDS THAT DISPLAY CONTEXTUAL INFORMATION AND ACTIONS FOR BACKEND SYSTEMS

(71) Applicant: VMware, Inc., Palo Alto, CA (US)

(72) Inventors: Ian Ragsdale, Atlanta, GA (US); Adam Cianfichi, Newark, DE (US); Neal Foster, Austin, TX (US); Marshall Anne Busbee, Atlanta, GA (US); Dan Zeck, Roswell, GA (US); Rob Worsnop, Atlanta, GA (US); Anthony Kueh, San Jose, CA (US); Andrew Eye, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/416,444

(22) Filed: Jan. 26, 2017

(65) Prior Publication Data

US 2018/0097768 A1  Apr. 5, 2018

Related U.S. Application Data

(63) Continuation of application No. 15/369,888, filed on Dec. 6, 2016.

(Continued)

(51) Int. Cl.
*G06F 15/16* (2006.01)
*H04L 12/58* (2006.01)
(Continued)

(52) U.S. Cl.
CPC .......... *H04L 51/26* (2013.01); *G06F 3/04883* (2013.01); *G06F 16/90335* (2019.01);
(Continued)

(58) Field of Classification Search
None
See application file for complete search history.

(56) References Cited

U.S. PATENT DOCUMENTS

| 6,457,009 B1 | 9/2002 | Bollay |
| 6,546,417 B1 | 4/2003 | Baker |

(Continued)

OTHER PUBLICATIONS

Salesforce, Using the Salesforce Side Panel to Work with Records in Microsoft Outlook, May 17, 2013, Youtube.com, URL: https://www.youtube.com/watch?v=ffzF-WYmS0g (Year: 2013).*

(Continued)

*Primary Examiner* — Mohamed Ibrahim
(74) *Attorney, Agent, or Firm* — Clayton, McKay & Bailey, PC

(57) ABSTRACT

Systems herein supply hero cards that display contextual information and actions based on backend systems. The information and actions are related to a trigger content item in an application that does not have access to the backend systems. A hero agent running a user device can communicate the trigger content to a hero server. The hero server can determine which connectors to backend systems relate to the user device, and then can retrieve result information from one or more of the backend systems. The result information populates the hero card, which the hero agent displays within the application. Action buttons on the hero card cause the hero agent to contact one or more of the backend systems to cause an action to take place there.

20 Claims, 8 Drawing Sheets

Related U.S. Application Data

(60) Provisional application No. 62/403,199, filed on Oct. 2, 2016.

(51) Int. Cl.
  *G06Q 10/10* (2012.01)
  *G06F 16/903* (2019.01)
  *G06F 3/0488* (2013.01)
  *H04L 29/08* (2006.01)

(52) U.S. Cl.
  CPC ......... *G06Q 10/103* (2013.01); *H04L 51/046* (2013.01); *H04L 51/32* (2013.01); *H04L 67/02* (2013.01)

(56) References Cited

U.S. PATENT DOCUMENTS

| | | | |
|---|---|---|---|
| 7,330,824 | B1 | 2/2008 | Kanojia |
| 9,369,333 | B1 | 6/2016 | Chiu |
| 9,460,299 | B2* | 10/2016 | Weiss ..................... G06F 21/604 |
| 9,483,393 | B1 | 11/2016 | Suttle |
| 9,554,197 | B2 | 1/2017 | Oh |
| 9,699,729 | B2 | 7/2017 | Lebon-Schneider |
| 9,774,586 | B1 | 9/2017 | Roche |
| 9,800,711 | B2 | 10/2017 | Brown |
| 9,973,452 | B2 | 5/2018 | Dumans |
| 10,095,676 | B2 | 10/2018 | Wetzel |
| 2003/0018661 | A1 | 1/2003 | Darugar |
| 2006/0075043 | A1* | 4/2006 | Chen ...................... H04L 51/34 709/206 |
| 2006/0136811 | A1 | 6/2006 | Burago |
| 2007/0157113 | A1 | 7/2007 | Bishop |
| 2008/0005247 | A9 | 1/2008 | Khoo |
| 2009/0228807 | A1 | 9/2009 | Lemay |
| 2009/0271283 | A1 | 10/2009 | Fosnacht |
| 2011/0105154 | A1 | 5/2011 | Kim |
| 2011/0179362 | A1* | 7/2011 | Craddock ............... H04L 51/08 715/752 |
| 2011/0282969 | A1 | 11/2011 | Iyer |
| 2013/0086597 | A1 | 4/2013 | Cornwall |
| 2013/0111500 | A1 | 5/2013 | Dixon |
| 2013/0159432 | A1 | 6/2013 | Deering |
| 2013/0173727 | A1 | 7/2013 | Libin |
| 2014/0040756 | A1 | 2/2014 | Bukurak |
| 2014/0052797 | A1* | 2/2014 | Lessard ................... H04L 51/18 709/206 |
| 2014/0095894 | A1 | 4/2014 | Barton |
| 2014/0100871 | A1* | 4/2014 | Toleti ..................... G06Q 50/22 705/3 |
| 2014/0215312 | A1 | 7/2014 | Hicks |
| 2014/0245176 | A1 | 8/2014 | Murali |
| 2014/0245178 | A1 | 8/2014 | Smith |
| 2014/0278935 | A1 | 9/2014 | Gara |
| 2014/0282254 | A1* | 9/2014 | Feiereisen ........... G06F 3/04842 715/835 |
| 2014/0337441 | A1 | 11/2014 | Schnitman |
| 2014/0344273 | A1 | 11/2014 | Haines |
| 2015/0007048 | A1 | 1/2015 | Dumans |
| 2015/0143258 | A1 | 5/2015 | Carolan |
| 2015/0271118 | A1* | 9/2015 | Nudel ..................... H04L 51/08 709/206 |
| 2015/0319123 | A1 | 11/2015 | Dumans |
| 2015/0350134 | A1 | 12/2015 | Yang |
| 2016/0320926 | A1 | 11/2016 | Ganin |
| 2016/0328097 | A1* | 11/2016 | Ganin ................... G06F 3/0482 |
| 2017/0346811 | A1 | 11/2017 | Newell |

OTHER PUBLICATIONS

Boxer, Boxer for Android—A Better Inbox, Sep. 2, 2014, Youtube. com, URL: https://www.youtube.com/watch?v=ZO-rkDeeeCc (Year: 2014).*

Salesforce App for Outlook, Aug. 30, 2015, URL: https://web.archive.org/web/20150830163042/https://releasenotes.docs.salesforce.com/en-us/winter16/release-notes/rn_sales_email_connect_salesforce_app_for_outlook.htm (Year: 2015).*

Office Action received in U.S. Appl. No. 15/369,888 dated Jul. 27, 2018.

OurSalesForceAdmin, Setting up Outlook Salesforce Sync, Jun. 15, 2014, Youtube.com, URL : https://www.youtube.com/watch?v=xMptKztxYg4.

Anatara Bhattacharya, How to integrate Facebook with Salesforce, Oct. 9, 2014, URL : https://web.archive.org/web/20141009001443/http://appshark.com:80/blog/how-to-integrate-facebook-with-salesforce/.

Final Rejection dated Feb. 25, 2019 for U.S. Appl. No. 15/369,888.
Office Action dated Aug. 1, 2019 for U.S. Appl. No. 15/343,225.
International Search Report and Written Opinion dated Aug. 31, 2017 for PCT/US2017/038821.

* cited by examiner

FIG. 6B

HERO CARDS THAT DISPLAY CONTEXTUAL INFORMATION AND ACTIONS FOR BACKEND SYSTEMS

CROSS REFERENCE TO RELATED APPLICATION

This patent application claims benefit of priority as a continuation of U.S. patent application Ser. No. 15/369,888 ("Hero Cards That Display Contextual Information and Actions for Backend Systems"), filed Dec. 6, 2016, which claims priority to U.S. provisional patent application No. 62/403,199 ("Hero Cards that Display Contextual Information and Actions for Backend Systems"), filed Oct. 2, 2016, both of which are expressly incorporated by reference.

BACKGROUND

Work efficiency is a goal of all enterprise systems. Enterprises use a vast number of different systems and applications designed to increase user productivity. Although many technological advances have helped users increase their efficiency, the number of systems used to track every aspect of our work also increases the amount of information each enterprise user must process. Keeping all of these systems up to date can introduce additional steps into the user's workflow. The more systems and tools put at the user's disposal, the more information the user must move between the different applications and systems. For example, when a user receives an email, they may need to update a status in SALESFORCE, JIRA, CONCUR, an internal docketing system, and other services. This can be time consuming, especially for a user of a mobile device. Additionally, the user might not realize the significance of content received in one application to information in another system.

Current technology offers little assistance to the user in this regard. When an email client does not have access to a backend system, it is completely up to the user to recognize and understand how information in one system relates to the other. Very little context or notice is given. For example, an email that impacts one of the user's accounts in SALESFORCE still looks like a normal email. The user might not recognize the sender as a current or potential sales lead. They, therefore, might not update SALESFORCE. They also do not receive note that they should prioritize that email over any others in their inbox.

Managing related content in backend systems can be particularly difficult on a mobile user device. Screen space can be limited, so opening multiple applications to search for related information and actions can be cumbersome. Additionally, moving information between applications can require exiting or minimizing one application and opening another. Manually copying information between applications and unassociated backend systems can be difficult.

For at least these reasons, a need exists for hero cards that display contextual and relevant information for backend systems.

SUMMARY

It is to be understood that both the foregoing general description and the following detailed description are exemplary and explanatory only and are not restrictive of the examples, as claimed.

In one example, a system dynamically builds hero cards that draw relationships between content in an application and information and actions in one or more backend systems. The hero cards can display contextual information based on these relationships. The hero cards can display in the application, such as an email application, despite the application not having direct access to the backend systems. The hero card can present actions that the user can perform at the backend system from within the application. In one example, a hero agent is installed on a user device, such as a laptop, cell phone, or personal computer. The hero agent can communicate with the email application. Content within the application can trigger the hero agent to request a hero card from a hero server. The hero server can determine backend systems used by the user and search for related content in each of them.

In response to a trigger, the hero server can receive a service request from the hero agent or another server. The application where the trigger content resides can be an email application, such as BOXER, but other application types are also possible. The application can be unassociated with several backend systems, such as SALESFORCE, JIRA, CONCUR, and others. However, the hero server can track which of the systems relate to a user, or to a group to which the user belongs. The hero server can determine whether the trigger content relates to any actions or information in the backend systems associated with the user.

The hero server can have different connectors and recipes for querying the associated backend systems and for offering actions to the user. A connector can include code for connecting to the backend system, such as JAVA, a uniform resource locator ("URL") of the backend system, or an HTTP request. A recipe can include code for converting metadata from trigger content into query inputs, and logic for performing one or more queries. A backend system can include one or more servers or databases that can use the recipes to perform actions. The actions can include searches or database updates.

After querying the backend systems, the hero server can construct a hero card to visually display the relationship within the application where the trigger content resides. The hero card can display backend system information and provide buttons for performing actions in the backend system. Therefore, from within the unassociated application, the user can perform actions in the backend systems and understand how the trigger content relates to those backend systems.

When the hero agent sends the service request, it can include one or more authentication tokens from the user device. The tokens can allow the hero server to authenticate the user and also determine which group the user belongs to. Different tenants or groups within tenants can have different associated backend systems. Tenants and groups within tenants are both considered groups for the purposes of this disclosure. Because the groups can be associated with different backend systems, the hero server can also associate them with different sets of connectors. For example, a first tenant might use SALESFORCE only, whereas a second tenant uses SALESFORCE and CONCUR. The hero server can determine a subset of connectors that applies to the user or user device. Then, using the subset of connectors, the hero server can access the corresponding backend systems. Each backend system can have a different data model that the connectors are able to communicate with. Based on the applicable connectors, the hero server can apply one or more recipes to the corresponding backend systems.

The recipe can relate aspects of the trigger content to the data model of the backend system for querying purposes. Recipes can require predefined input parameter types based on aspects of the trigger content. The input parameters can be found, for example, in content metadata. The hero server can select a recipe based on the connector, the types of available metadata, and the application where the trigger content resides. Example content metadata can include the sender, the recipient, the subject, the content type, and keywords within the content.

Applying the recipe can include executing a query or sending a series of requests to the first backend system. In response, the hero server can receive result information from the first backend system. The result information can be used to assemble a hero card.

Assembling a hero card can include creating a JSON message that can be interpreted by the hero agent. The JSON message can include the result information from the first backend system. For example, the result information can notify the user of information in the backend system that relates to the trigger content. Additionally, the result information can include actions to take in the backend system that relate to the trigger content. The actions can be interpreted by the hero agent to provide buttons on the hero card. While a JSON message is one example, any other message format is possible, such as XML.

The hero server can send the assembled hero card to the hero agent on the user device. Because the hero agent can be integrated with the application, it can also cause the application to display the hero card. This effectively allows presentation of backend system information or actions within the unassociated application with the related trigger content.

The hero card can include a header region, a body region, and an action region. Based on the result information, one or more of those regions can populate. The header region can be used to graphically indicate the related backend system(s). The body region can provide information from the backend system(s). The action region can include one or more buttons or fields for sending instructions to the backend system(s) for carrying out related actions there. One hero card can have multiple action buttons that perform functions across multiple backend systems.

A system that assembles and displays hero cards as described herein can save a user valuable time by contextualizing content across backend systems that are inaccessible by the application where the content resides. This is especially helpful when the user is using a mobile device such as a smartphone or tablet.

BRIEF DESCRIPTION OF THE DRAWINGS

FIG. 6B is an exemplary illustration of a graphical user interface.

DESCRIPTION OF THE EXAMPLES

Figure 1:
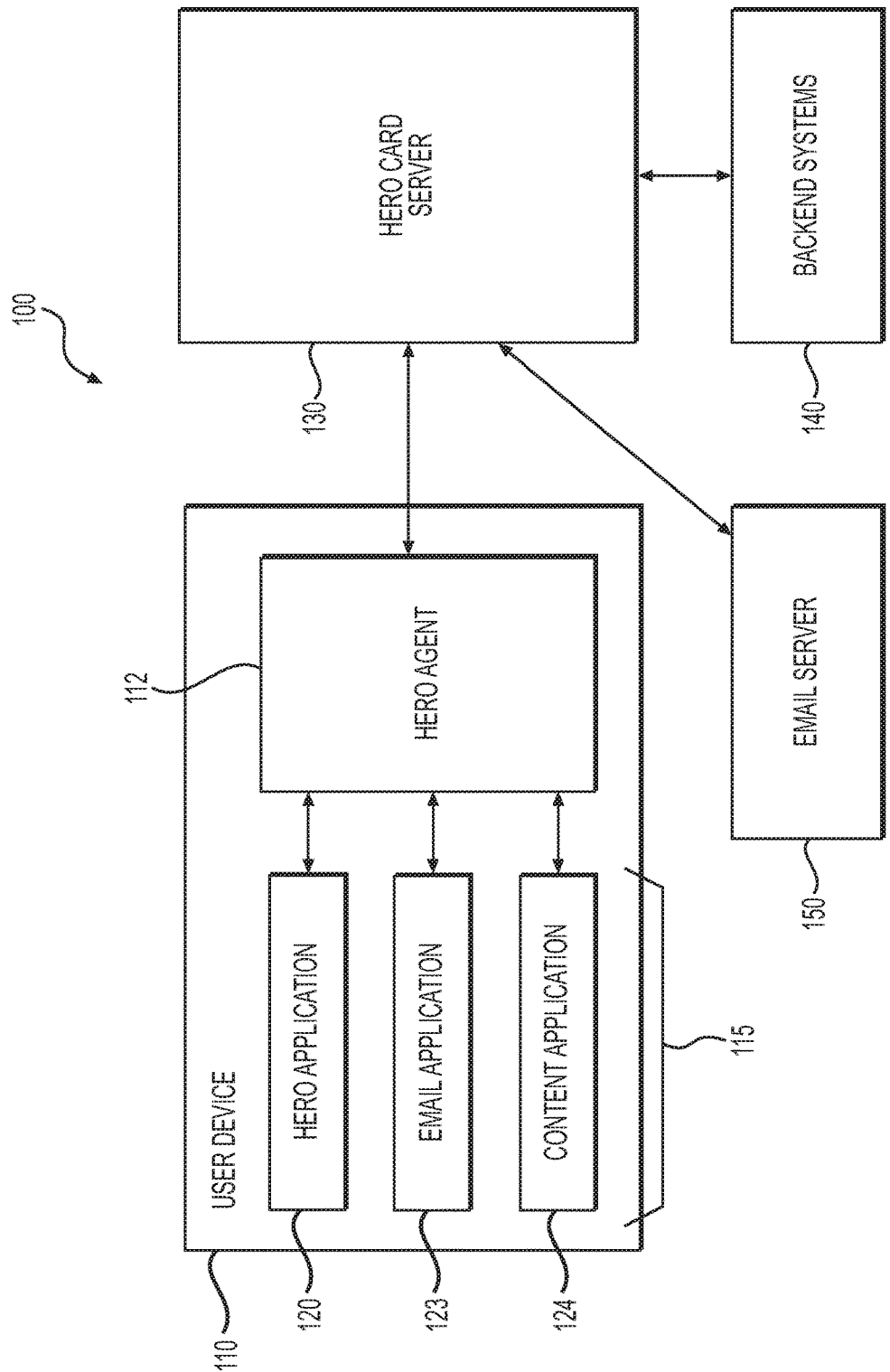
FIG. 1 is an exemplary illustration of system components.

Reference will now be made in detail to the present examples, including examples illustrated in the accompanying drawings. Wherever possible, the same reference numbers will be used throughout the drawings to refer to the same or like parts.

Systems herein assemble hero cards that display information and actions relevant to a content item. The content item can reside in an application that is separate from one or more backend systems. By displaying the information in a hero card within the application, the user can understand the content item relates to the separate backend systems, or vice versa. This can include information not otherwise apparent in the application. The hero card can also allow the user to perform actions at the backend system from within the separate application. The user need not switch from the application to the backend system in order to learn the information or perform the action. This can greatly increase work efficiency, especially in enterprise environments having multiple backend systems and a mobile device enabled workforce.

A hero agent running a user device or other server (such as a mail server) can detect trigger content within an application. The trigger content can be content that enters an application that is integrated with the hero agent. For example, an email application can be configured to report new emails to the hero agent. The hero agent can send a service request to a hero server. The service request can include the trigger content. In one example, supplying the trigger content includes supplying metadata extracted by the hero agent from the trigger content.

A service request from the hero agent can include an authentication token from the user device. The token can be used by the hero server to authenticate the user and validate the service request. In one example, it can also be used to determine a group to which the user belongs. From there, the hero server can determine associated backend systems, the connectors needed to connect to those backend systems, and the recipes to use for querying. Different recipes can be available based on the type of trigger content, the application, and the metadata of the trigger content. For example, a first recipe can query a backend system based on an email, and a second recipe can query the backend system based on a social media post. In response to the queries, the hero server can receive result information. The result information can include information from the backend system(s), or actions to perform at the backend system(s).

The hero server can assemble a hero card based on this result information. This can include building a JSON message to send to the hero agent. The hero agent or application can interpret the received hero card and display the hero card within the application. Action buttons on the hero card cause the hero agent to contact one or more of the backend systems to cause an action to take place there. This allows a user to surface relevant information from backend systems, including documents, e-mail, prior notes, sales leads, and more. A user can proliferate information or actions between systems without having to switch between them.

The buttons can cause the hero server or user device to instantiate an action recipe at the respective backend system, in an example. The action can cause an update at the backend system 140. For example, a button to schedule a meeting can cause a backend system to schedule the meeting. This can help keep backend systems synchronized with the application and other backend systems.

FIG. 1 illustrates an exemplary system 100 for providing hero cards in an application. A user device 110 can be any computing device, such as a smartphone, laptop, tablet, personal computer, or workstation. A user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others.

The user device 110 can execute applications 115. Some of these applications can be managed applications 115 with functionality that can be controlled by a management server. An administrator can configure functionality and access restrictions for particular users or groups of users at the management server. Then the management server can control file access and device functionality of the user device 110 accordingly. For example, the management server can turn off functionality at the user device 110, such as printing, emailing, or Internet access. Additionally, a content application on a first user device can be configured to allow access to a first repository but not a second, whereas a second user device can be configured to access the second repository. These access and functionality settings can be stored in profiles that the management server links to users or user devices.

The management server can control the managed applications 115 through interaction with a management agent that can execute on the user device 110. The management agent can be an application or part of an operating system, and can enable or disable functionality on the user device 110. The hero agent 112 can be part of the management agent. The management agent can be installed when the user device 110 enrolls with the management server, in one example. The management server can be part of an enterprise mobility management ("EMM") system. The management server can dictate which managed applications are installed, such as based on which user group a user belongs to. Similarly, specific functionality within the managed applications 115 can be enabled or disabled by the management server, and can vary per user or user group.

Managed applications 115 can allow a user to communicate on an enterprise network with the hero server 130 to securely access files. This can allow a user to use their own user device 110, such as a cell phone, in a work environment while limiting access to work files (for example, by providing file access only to the managed applications). In one example, the hero agent 112 is part of a management agent. The hero server 130 can also be part of a management server 130. However, the hero agent 112 can be provided separately from EMM management and can work agnostically with regard to managed and unmanaged applications 115. A management server need not be provided in all examples.

In the illustrated example, a hero application 120, email application 123, and content application 124 are all configured to operate with the hero agent 112. The hero application 120 can be a stand-alone application for viewing hero cards. For example, a user can browse cards that have been created based on trigger content detected by the hero agent 112 or hero server 130. The email application 123 can include a location in its graphical user interface ("GUI") for displaying hero cards. Incoming and outgoing emails can act as trigger content for building hero cards. The content application 124 similarly can have a location in its GUI for displaying hero cards. The trigger content can be the documents being searched, viewed, or created in the content application 124.

Backend systems 140 can operate separately from the applications 115. The backend systems 140 can provide services that a user is authorized to use. These can be third-party services or can be internal to the enterprise. But because they operate separately from applications 115, they can maintain their own databases and not share information with applications 115. The hero server 130 can connect related information from these disparate sources. The terms "backend system," "backend server," and "backend database" are used interchangeably for convenience. A backend system 140 can include one or more servers and one or more databases. Similarly, a backend server 140 or backend database 140 can include one or more servers or databases.

The hero agent 112 can include a device-level component, such as an application programming interface (an "API"), agent application, hypervisor, or virtualized device, and an application-level component, such as an API, SDK, application wrapper, or workspace agent application). The device-level management agent can include system level privileges. The application-level management agent can include privileges in managed applications 115, which can be developed for operation with the hero server 130. Reference to the hero agent 112 is understood to include either or both of the device-level and application-level components unless otherwise specified.

The hero server 130 can interact with the hero agent 112 with calls to an application (e.g., application level) or the operating system (e.g., device level) of a user device 110. In one example, the hero server 130 can send messages to the hero agent 112 and call subroutines in the hero agent 112. In addition, the hero server 130 or a management server can uninstall the hero agent 112 or associated applications, such as hero application 120. This can be done, for example, if the user device 110 is lost or if an employee leaves the job. It can also be done if the user device 110 falls out of compliance with enterprise compliance rules.

In one example, the hero agent 112 can execute on the user device 110. The hero agent 112 can be a plugin or an application that is installed on the user device 110. In one example, it is installed based on instructions from a management server or the hero server 130.

The hero agent 112 can run persistently on the user device 110, periodically checking for incoming content based in various applications 115. Trigger content can be any content that meets criteria for requesting a hero card. Trigger content can be defined by templates in one example. The hero agent 112 can download target templates from the hero server 130 that determine what indicators in content the hero agent 112 looks for. When the indicators are met, the content is considered trigger content. It causes the hero agent 112 to send a service request to the hero server 130.

The hero agent 112 can check for trigger content based on hooks in the applications 115 in one example. Hooks can be placeholders in the application that allow for additional programming for synching with the hero agent 112. Alternatively, hooks can be API procedures that are implemented by the hero agent 112, to achieve communication with the applications 115.

In one example, the hero server 130 can check for trigger content as an alternative or in addition to the hero agent 112. For example, email from an email server 150 can be routed to pass through the hero server 130. In one example, this can allow the hero server 130 to prepare a hero card prior to the email reaching the user device 110. Another server, such as email server 150 can also check for trigger content. In one example, the hero agent 112 executes on the email server 150 and communicates with the hero server 130 when a trigger is detected. However, the hero server 130 can need user credentials to access information in backend systems 140 relating to the user. In one example, the hero server 130 can wait for the user to login to the user device 110 and communicate with the hero server 130 before receiving the credentials needed to authenticate and query at the backend systems 140. This can allow the system to provide contextual information based on messages at the email server 150.

The hero server 130 can be located remotely from the user device 110. The user device 110 can communicate with the hero server 130 over a network using one or more modulators, demodulators, multiplexers, demultiplexers, network communication devices, wireless devices, antennas, modems, and any other type of device configured to enable data communication through a communication network. The network over which files are sent and retrieved can be an enterprise network in one example. The network can include the Internet, a local area network, or any other suitable communication platform. The user device 110 can communicate over the network using one or more modulators, demodulators, multiplexers, demultiplexers, network communication devices, wireless devices, antennas, modems, and any other type of device configured to enable data communication through a communication network.

The hero server 130 can store information needed for using attributes of trigger content to find related information in the backend systems. For example, it can store connectors, which can include code for connecting to backend systems 140. It can also store recipes in relation to the connectors. One or more stored recipes can match triggering content to a data model for a backend service 140.

When a match exists, the hero agent 112 can receive a hero card from the hero card server 130. The hero card can display within an application, such as email application 123, and can include information specific to one or more backend services 140 that are not part of the application within which the hero card displays. The hero card can be a JSON message that the hero application 120 uses to construct an area within a graphical user interface ("GUI") of the email application.

In addition to matching keywords in backend queries, the hero server 130 can also implement tag-based recipes, in one example. This can involve comparing tags from trigger content, such as a calendar event, to tags in backend systems 140. The hero agent 112 or hero server 130 can automatically extract tags that have been applied to documents, such as emails, word processing documents, drawings, and notes. Example tags can include document authors, senders, recipients, and editors. Other tags can include a title, keywords, a location, or a date. Each content type can have particular types of tags. For example, a calendar invitation can include tags that represent a sender, the recipients, and the location of a meeting. Additional tags can be gathered from any attachments to the corresponding meeting invite.

Tags can be assigned to link common documents, users, or recurring meetings. For example, different document versions can include a common document tag. Recurring or rescheduled meetings can include a common meeting tag. Emails that are part of a thread can similarly include a common tag. In this way, a single content item or meeting event can include many tags. The management agent or management server can automatically determine and apply tags for different documents, such as emails, word processing documents, drawings, and notes. Example tags can include document authors, senders, recipients, and editors. Other tags can include a title, keywords, a location, or a date. Tags can be assigned to link common documents or recurring meetings.

Tags can be used to identify trigger content in one example. A template that defines trigger content can specify which tags to analyze or provide to the backend. As an example, a meeting tag in an email can cause the hero agent 112 to identify the email as trigger content. The meeting information can be used to build a hero card based on relevant information in a backend system 140. For example, the backend systems 140 can have their own separate calendars associated with the user, or date-stamped tasks that could be relevant to the meeting.

Therefore, tags can also be used for searching backend systems 140. As an example, the hero server 130 can use tags gathered from a meeting event and attached files as recipe inputs to one or more backend systems 140. For example, the hero agent 112 can send a service request after triggering based on detecting a tag combination in an email sent to email application 123. The tags can include start date, end date, sender user, and recipient users, in one example.

The hero server 130 can use the tags to query a backend system 140 based on one or more connectors associated with the user device 110. The backend system 140 can use similar tags, or the recipe can translate tag inputs into data and structures that exist in the data model of the backend system 140. Related items can be returned as result information to the hero server 130. The hero server 130 can pass some or all of the result information back to the hero agent 112, for example, in a JSON message. The hero agent 112 can render a hero card in the email application 123 from the JSON message.

The hero agent 112 can interface similarly with other applications 115, such as content application 124. Documents within the content application 124 can trigger the creation of hero card. The system can use keywords, authors, and tags within the documents to implement recipes at the hero server 130. The hero agent 112 can similarly interface with other applications 115, such as a notes application, One Drive, or even a standalone hero card viewer 120.

Figure 2:
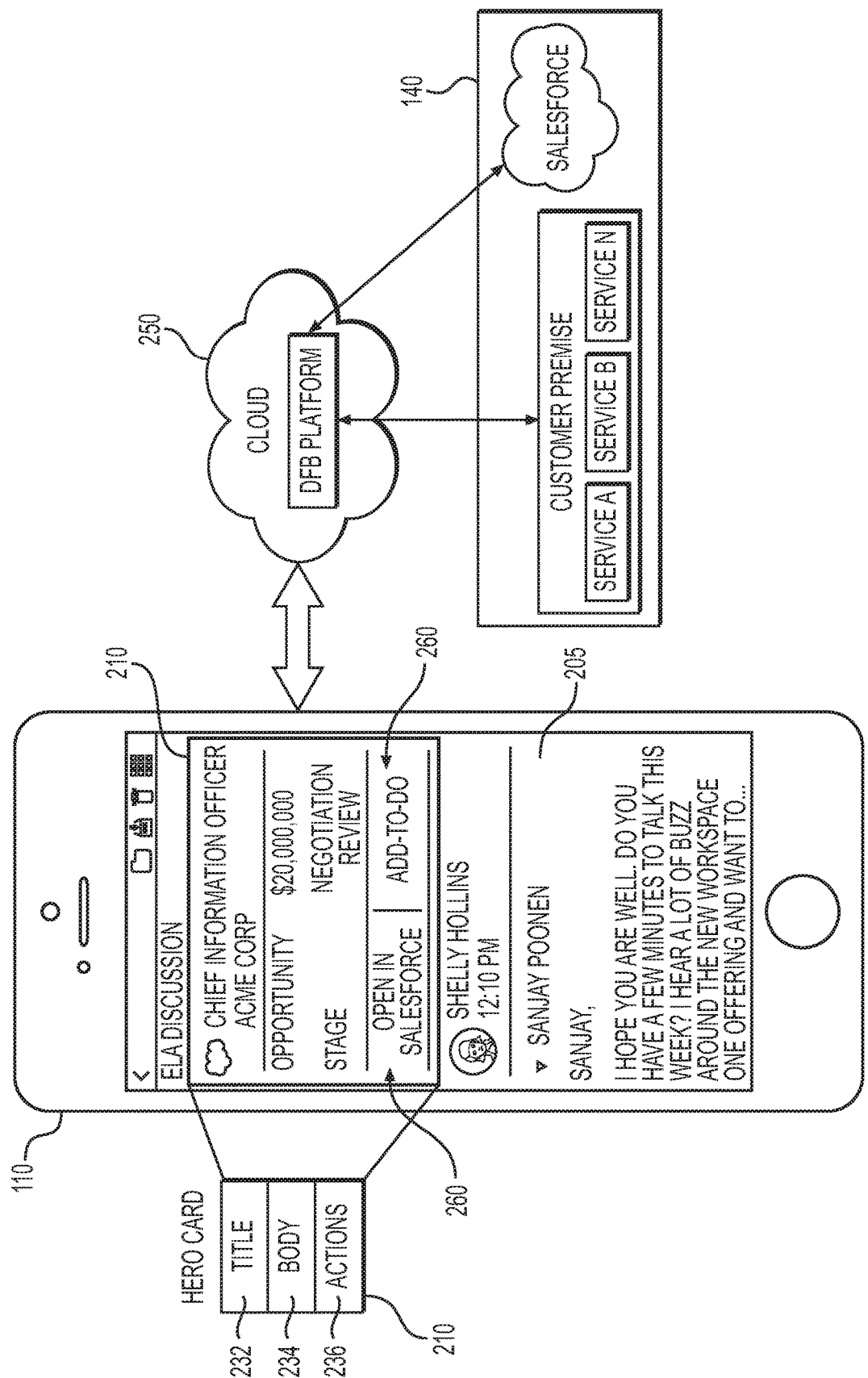
FIG. 2 is an exemplary illustration of an example graphical user interface and system components.

FIG. 2 illustrates an example hero card 210 being displayed on a user device 110. In this example, an email application 123 displays a GUI. The GUI includes an email body 205 that is displayed for the user to read. The GUI also includes an area for one or more hero cards 210. In this example, the hero card includes actions to perform in SALESFORCE, which is not otherwise accessible by the email application 123. Multiple hero cards can display in the hero card area of the GUI, such as in a hero card carousel.

In this example, the hero card 210 can be generated as follows. First, the email 205 can act as trigger content. The hero agent 112 can detect metadata in the email 205 that gets sent to the hero server 130. In this example, the hero server 130 is in the cloud 250. The hero agent 112 is configured to contact the hero server 130 with the service request. The service request can include a token from the user device that the hero server 130 can use to identify the user or attributes of the user. For example, the token can include a tenant identifier that allows the hero server 130 to determine which tenant is associated with the user. The tenant identifier can be a domain name in one example. In another example, it can be a string of letters and numbers. The tenant can be any type of customer, such as a company or organization.

The system can manage multiple tenants and track which backend systems 140 apply to each tenant. In the example of FIG. 2, the tenant can be associated with four backend systems 140 out of a larger set of possible backend systems 140. In the illustrated example, the backend systems 140 include three internal services (ServiceA, ServiceB, and ServiceN). The backend systems 140 also include SALESFORCE, a third-party service. However, a second tenant can be associated with overlapping or different backend systems 140.

Tenants can also be associated with different subset of connectors that are selected from a larger set of connectors.

The connectors can correlate to the backend systems 140 utilized by the tenant. The hero server 130 can identify the connectors associated with the four backend systems 140 associated with the user. The hero server 130 can also identify recipes for those connectors that are configured to take email metadata as an input. The email metadata can be used according to the recipes to search for related information in all four backend systems 140. Some or all of the backend systems 140 can return result information.

Based on the result information, the hero server 130 can assemble the hero card 210. The hero card 210 can be assembled differently for different tenants, in one example. The hero card 210 can also be assembled differently based on an application in which the hero card 210 will display. Some applications can have dedicated spaces, such as frames, for displaying hero cards. These spaces can differ in size. In another example, the hero cards 210 are given a uniform structure that can be interpreted for display differently, depending on the tenant or the specific application that displays the hero card 210.

The hero card 210 structure can include a header region 232, body region 234, and actions region 236. Hero cards 210 can include one, two, or three of these regions, depending on the result information. In this particular example, the recipe(s) can use the result information to populate all three regions.

The action region example illustrated in FIG. 2 contains two buttons 260. A first button 260 can be configured to contact a first backend system 140. The hero agent 112 can make compatible API calls to the first backend system. In this example, the first button 260 opens the contact in SALESFORCE. A second button 260 can be configured to contact a second backend system 140. The hero agent 112 can make compatible API calls to the second backend system. In this example, the second button 260 adds a to-do to a scheduling system.

The buttons can cause the hero server 130 to instantiate an action recipe at the respective backend system 140, in an example. The action can cause an update at the backend system 140. For example, a button to schedule a meeting can cause a backend system 140 to schedule the meeting. This can help keep backend systems 140 synchronized with the application and other backend systems 140. In another example, a user could select to log the conversation to a third-party backend system, such as SALESFORCE, to easily record the conversation with a customer from within an e-mail application to a customer relationship management system.

In another example, the hero card button contains a direct link to the backend system 140. The user device 110 can connect to the backend system 140 using authentication credentials. These can be previously obtained credentials or the credentialing can be done through an authentication server, such as an OAuth server. The direct link can cause an action to occur at the backend system 140. As an example, an action to complete a task at the backend system 140 could cause a script, such as an SQL script, to execute on the backend system 140. The link itself can provide relevant inputs to the backend system 140, and after authentication is complete the script can execute. As an example, an email can indicate that a user has completed a task. The system can generate a hero card that includes a direct link to the backend system 140 for updating the task to indicate that the task is complete. The link can include one or more attributes identifying the user and the task to update, and the status that the user seeks to update to. When the user selects the link, the OAuth server can authenticate the user at the backend system 140. Then the backend system 140 can perform the script identified by the link. The backend system 140 can send a message back to the user device to reflect whether the update was successful. The status can display on the hero card in one example.

Figure 3:
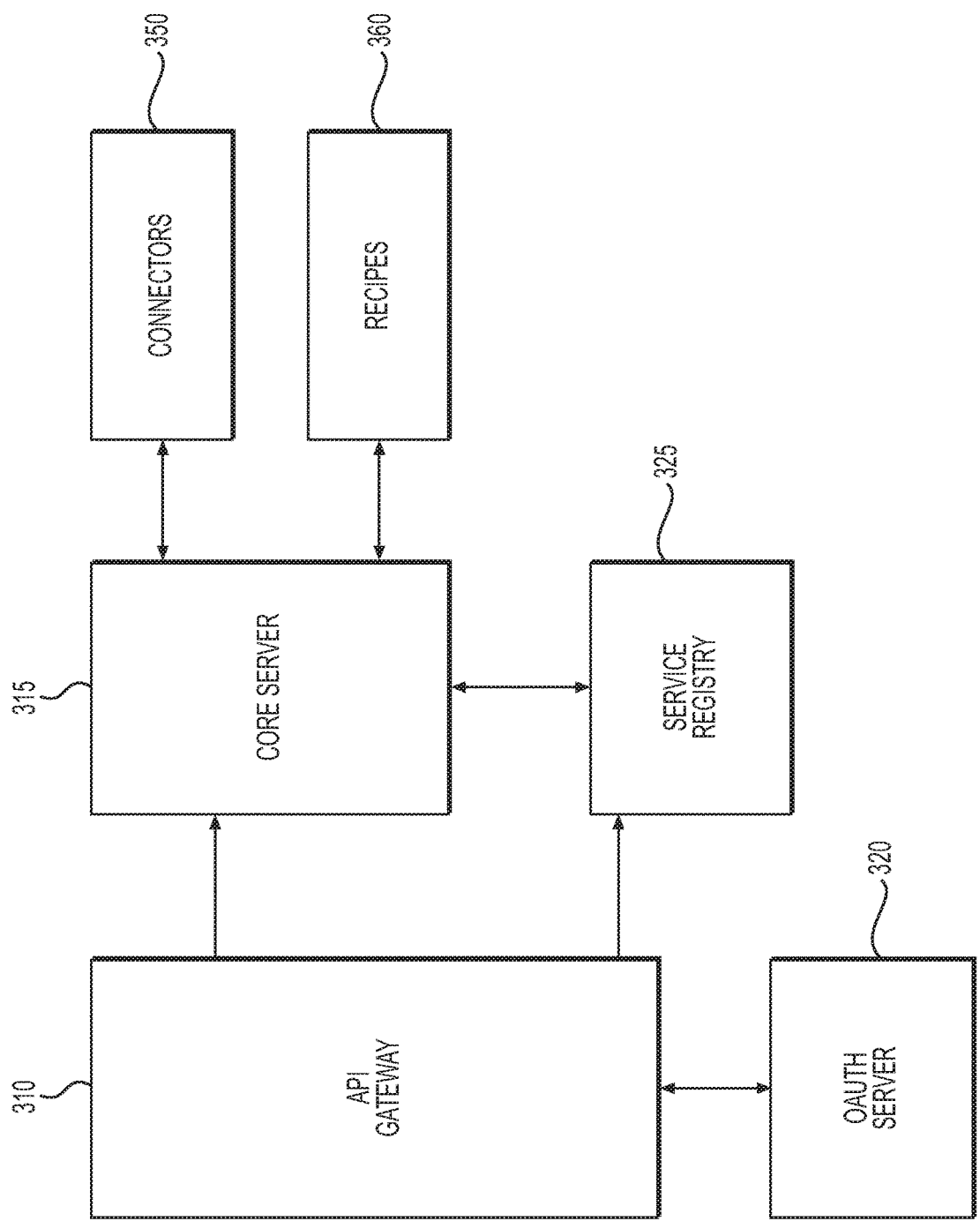
FIG. 3 is an exemplary illustration of system components.

FIG. 3 illustrates example system components. One or more of the components can make up the hero server 130 in an example. Alternatively, the hero server 130 can communicate with some or all of the components of FIG. 3, which can reside on one or more separate servers.

API gateway 310 can be a part of the hero server 130 that receives service requests from hero agent 112. It can authenticate users and validate the service requests. This can include input from the OAuth server 320 to validate a token received from the user device 110. Alternatively, the API gateway 310 itself can authenticate the user using the tokens from the applications 115. Authentication is further discussed below with respect to FIG. 5.

Optionally, the OAuth server 320 can be used for authenticating a user with backend system 140 using OAuth tokens. When an authentication request is triggered, a backend system 140 or hero server 130 can direct a user device 110 to authenticate at the OAuth server 320. The user device 110 or tenant system can provide credentials to the OAuth server 320. The OAuth server 320 can validate the credentials, and return credentials for use at the backend system 140. The credentials can be a key, or a certificate of the user's or tenant's identity. This can allow the user device 110, tenant system, or hero server 130 to communicate with the backend system 140. However, in some examples the system does not rely on an OAuth server 320. Other credentials and authentication steps, such as methods utilizing JSON tokens, are also possible. It will be appreciated that the process of authenticating the user or user device can occur without user interaction.

The API gateway 310 can also validate action service requests that result from a user selecting an action button in a hero card. When the user activates an action, the hero agent 112 can send an action service request to the API gateway 310. From there, the hero server 130 can send the applicable requests to the respective backend server 140.

The hero server 130 can assemble the requests including authentication information, connection information, and action information. The authentication information can include one or more tokens that identify the user or the hero server 130. The connection information can include one or more stored connectors 350. The action information can include one or more stored recipes 360. This information can be assembled based on the hero server 130 identifying which backend servers 140 to contact for the particular user and service request (e.g., action).

To assemble the connection information, the API gateway 310 can check with a service registry 325, in an example. The service registry 325 can store address information and some of the credentials for use at the backend servers 140. For example, the address information can include a URL and the credentials can include a token to use when contacting the backend server 140. In one example, the hero server 130 can retrieve this information from the service registry 325 for use in assembling the connectors 350.

For authentication at the backend server 140, the API gateway 310 can use a credential received from the user device 110 and also a credential stored at the core server 315. This can allow the core server 315 to send a request to the identified backend server 140 to update a group of users in an example. The core server 315 can be part of the hero server 130 introduced in FIG. 1. Alternatively, the hero server 130 can communicate with the core server 315. The core server 315 is referred to as part of the hero server 130 for convenience, but other configurations are possible.

After the API gateway 310 validates a request, the core server 315 portion of the hero server 130 can determine the applicable group. The groups can be stored at the hero server 130 or at a separate management server. An identifier from the user device 110 can be used to determine which group the user belongs to.

Groups, which can indicate different tenants or groups within tenants, can allow the hero server 130 to perform different functionality and connect to different backend servers 140 based on the groups associated with the user. A user can belong to one or more user groups. The hero server 130 can utilize the user groups to configure a user device 110 with different functionality depending on which groups the user belongs to. For example, a first user group can exist for executives and a second user group for quality control. The enterprise files and applications that are accessible can be different for different groups.

Similarly, different backend servers 140, connectors 350, and recipes 360 can be assigned to different groups. An executive group can have access to different searches than developers, for example. The groups can also have access to different backend servers 140, such as when a particular tool is available for one group but not another.

Based on the group, the core server 315 can determine the applicable connectors 350. In one example, the group is used to perform a look-up at the service registry 325 to retrieve the applicable connectors 350. Alternatively, connectors 350 for groups can be stored separately from connection information stored in a service registry 325. In another example, the core server 315 can assemble the connectors 350 from both group-specific information and information retrieved from the service registry 325.

In one example, the core server 315 can also use the group to determine the available recipes 360. For example, a database table can link the recipes 360 to the groups. Recipes 360 can be search requests used at the backend servers 140. For example, a recipe can include an API call recognized at the backend server 140 for performing a particular search. Alternatively, the recipe can be a search command, such as a call to a stored procedure on the backend server 140. The stored procedure call can include inputs, such as a user identifier, date ranges, and other inputs used to perform a search on the backend server 140. A user authentication token received with the service request can be used in the search requests.

Figure 4:
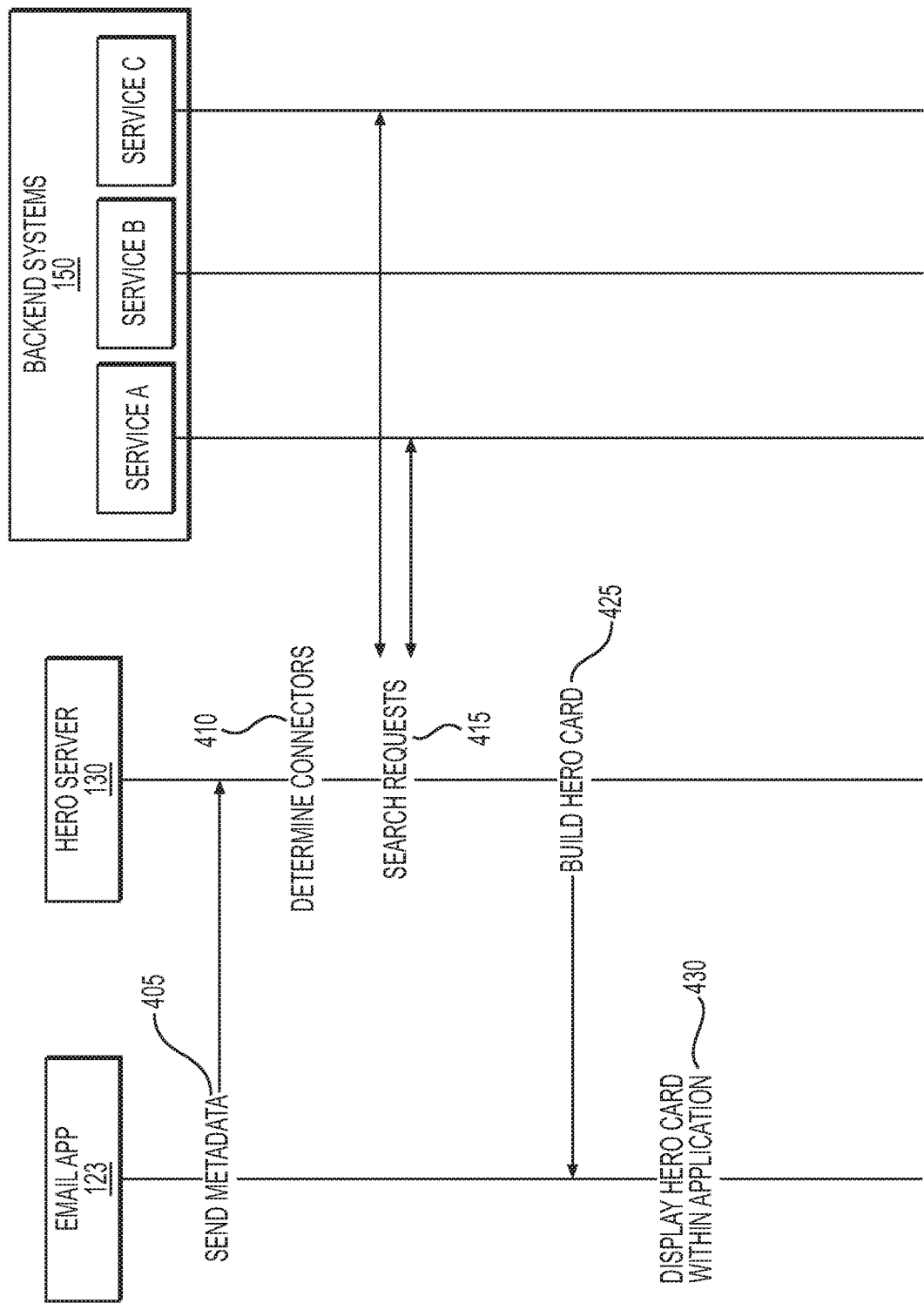
FIG. 4 is an exemplary method executed in a system.

FIG. 4 includes an exemplary flow chart of stages performed in a system. At stage 405, an email application 123 can send metadata to a hero server 130. The email application 123 is used as an example, but other applications can also be used. The metadata can be sent as part of a service request in response, triggered by one or more emails in the email application 123.

The hero server 130 can receive the service request and validate the user. Then, the hero server 130 can determine the connectors associated with the user at stage 410. In this example, connectors to Service A and Service C apply to the user.

At stage 415, the hero server 130 can submit search requests to the Backend Systems 140, and specifically Service A and Service C. The search request can include user authentication credentials. The user authentication credentials can be JSON web tokens in an example. The credentials can include a token submitted by the user device at stage 405, or a user ID and password supplied by the user. The search request can further include search parameters specified by a recipe, utilizing the metadata.

Based on the results of the search requests, the hero server can build a hero card 210 at stage 425. This can include building a JSON message that can be interpreted by the hero agent 112. Then, at stage 430, the email application 123 can display the hero card 210.

Figure 5:
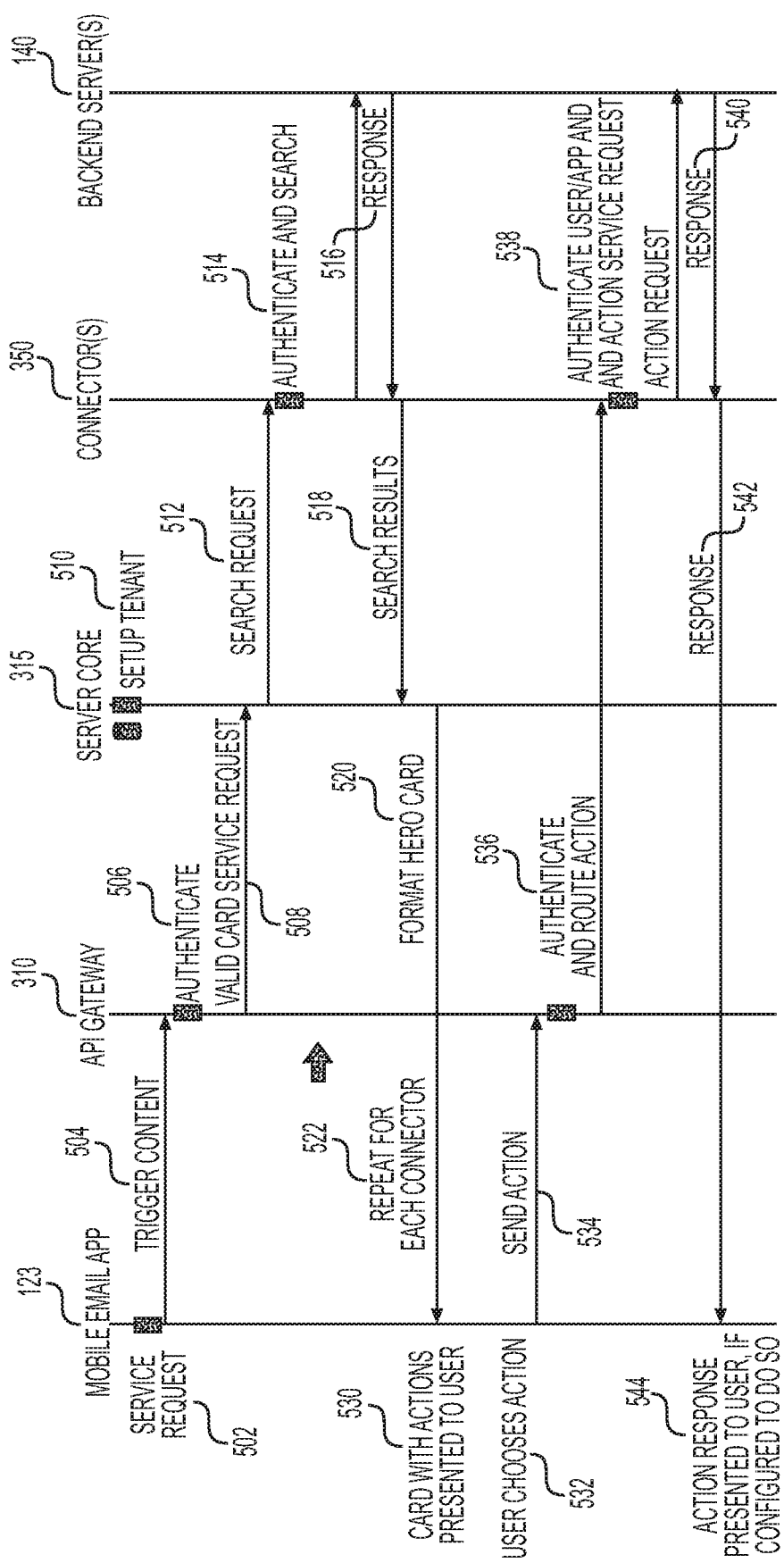
FIG. 5 is an exemplary method executed in a system.

FIG. 5 is a more detailed exemplary flow chart. At stage 502, the hero agent 112 can issue a service request. The service request can be in response to detecting trigger content. In this example, the trigger content can be an email in an email application 123. The hero agent 112 can be part of the email application 123 in an example. The hero agent 112 can parse the email and construct the service request. The service request can be an API call to the hero server 130.

At stage 504, the service request can be sent from the email application 123, such as by the hero agent 112. For example, it can be an API call that is made as a POST HTTP request. The API call can indicate a hero card service request and include metadata from the trigger content. Example metadata from a triggering email can include fields of the email, such as TO, FROM, and the contact. It can also include other parsing results, such as keywords located within the email. An application identifier can also be provided with service request, identifying the email application 123. The application identifier can be used by the system in determining which search requests to make, and on which backend servers 140.

At stage 506, the API gateway 310 can authenticate the user. It can also authenticate the application 123 and the service request, in an example. To facilitate authentication, the hero agent 112 can provide a user token and identify the application 123. After validation, at stage 508, the valid service request is sent to the server core 315 for fulfillment.

The server core 315 can be configured to service multiple tenants. For example, prior to receiving the service requests, the server core 315 can be set up at stage 510. Setup can include processing provisioning information for the multiple tenants. For example, an administrator can configure connector URLs and authentication details for each tenant. The administrator can also configure permitted actions for different tenants. Some tenants might want to provide more or less cross-platform actions for their employees to utilize. The administrator can set the server core 315 to limit cross-platform actions accordingly. Different tenant identifiers can be associated with different connectors in an example.

User groups can also be setup to govern different permissions, actions, and connector access. For example, a first user group can be configured to utilize more or different connectors than a second user group. If a first backend system 140 is used for quality assurance, then the quality assurance group can be linked with one or more connectors for the first backend system 140. However, a marketing group that that does not use the first backend system 140 can be unassociated with those same one or more connectors. In one example, user group identifiers can be associated with different connectors. In another example, user groups are given their own tenant identifiers and are tracked in the system as different tenants.

At stage 512, the server core 315 can perform the service request. After determining which connectors are associated with the user making the service request, the server core 315 can use a first connector to connect to a backend server 140. The connector can include one or more formatted search requests that are performed and one or more of the backend server 140. The search request can include a user authentication token, additional credentials, and search parameters. The search parameters can be a stored procedure or other query specified by a recipe for the application and connector 350.

At stage 514, the connector can authenticate the user, application, and search request. Then, for each backend server 140 indicated by the connector, the hero server 130 can send a custom search to the backend server 140. A single connector 350 can include different searches for performance at one or more backend servers 140. The backend server(s) 140 can execute the searches in parallel in an example. However, the exact backend session flow, request and response protocol, and subsequent responses and parameters can be specific to each connector 350 and backend server 140. In one example, an intermediary identification management system or proxy server can be used. In one example, logins can be required for some or all searches or actions at the backend system 140.

At stage 516, the backend server 140 can send a response back to the connector 350. The response can include a format or information types specified by the search of the connector 350. The connector can send a formatted response to the server core 315 at stage 518, containing some or all of the information from the response.

At stage 522, this process (beginning at stage 512) can be repeated for all provisioned connectors 350 for the tenant.

The result information can be extracted from the formatted response at stage 520. The system can format the hero card 210 as a JSON message with permissible actions. The permissible actions can identify the backend server 140 to which they apply. They can also include a key for accessing the backend server 140. In one example, the permissible actions identify the API gateway and include action information so that the hero server 130 can handle and route the action appropriately. The action information can identify a backend server 140 in one example. It can also include an action identifier that can be interpreted by a connector 350 or the identified backend server 140. It can further include key value pairs for authentication at the backend server 140.

At stage 530, the email application 123 can display the hero card 210 with actions. Display can depend on the application with which the hero agent 112 is operating. For example, the email application 123 can include a dedicated region for hero card 210 display. The hero agent 112 can format one or more hero cards 210 for display in the region. The hero card 210 can include one or more actions. The actions can be presented as buttons, links, or other interactive GUI elements.

At stage 532, the user can select one of the actions presented on the hero card 210. An example action could be to schedule a follow-up with a sales lead, or to indicate that a lead responded. This sort of action could be applied to SALESFORCE from within the email application 123 through use of the hero card 210.

This can cause the email application 123 to issue an action service request to the API gateway 310 at stage 534. The action service request can be handled by the system similarly to the service request of stages 502 and 504. This can be a POST HTTP request that identifies the backend and provides parameters for carrying out the action. The parameters can be the action information previously supplied by the search results at stage 518.

In one example, prior to performing the selected action, the user can be authenticated at stage 536. Upon authentication, a connector 350 implicated by the action can send the action request to the relevant backend service 140 at stage 538. This can cause the backend server 140, for example, to update a record in accordance with the action.

The backend server 140 can send a response at stage 540. The response can indicate that the action was performed. It can also provide additional information regarding the performance of the action in the backend database 140.

The hero server 130 can send the response back to the email application 123 at stage 542. This can cause the email application 123 to display the response at stage 544.

Figure 6A:
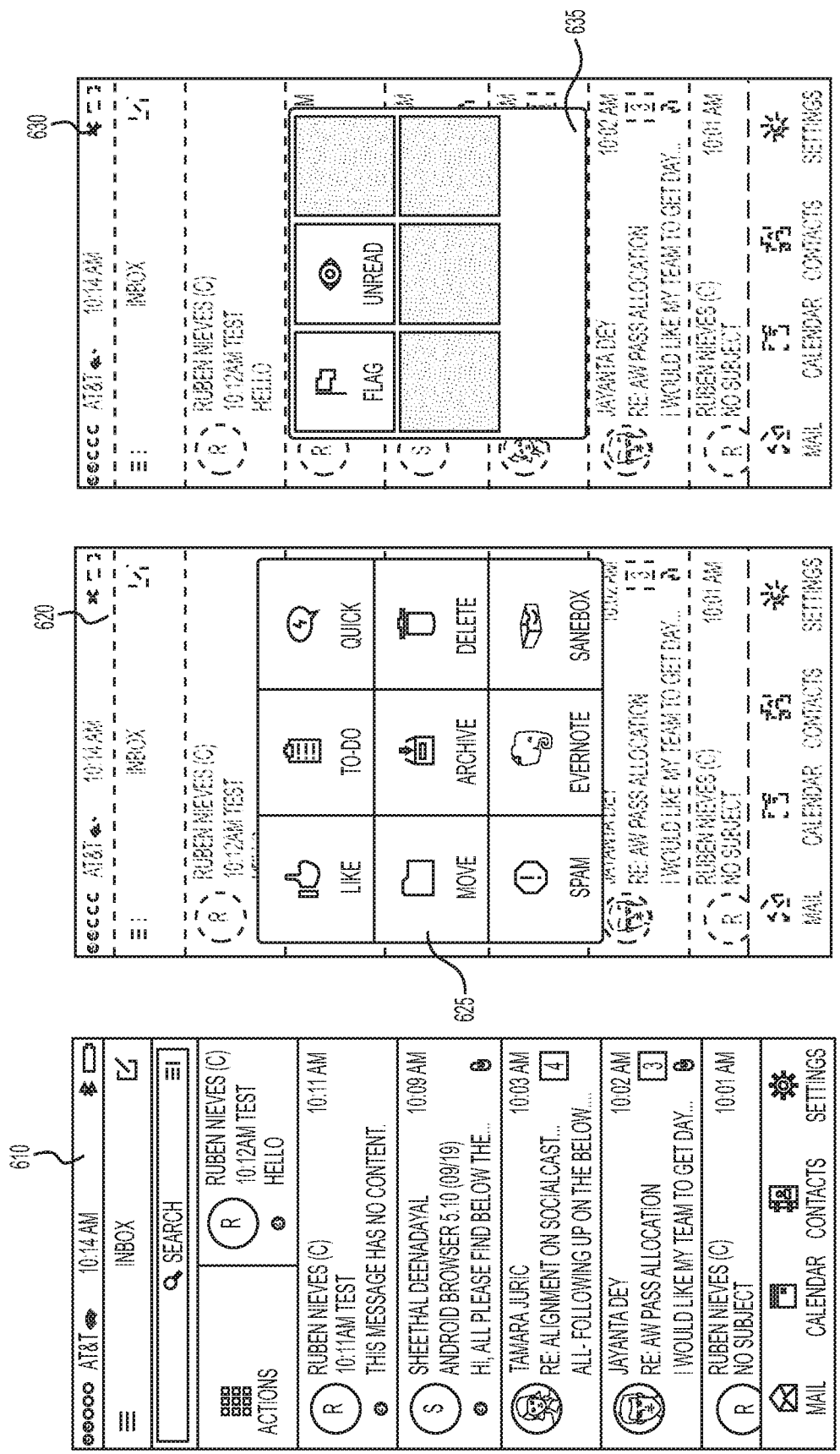
FIG. 6A is an exemplary illustration of a graphical user interface.

FIG. 6A illustrates example GUIs for creating hero actions for particular content items. In the first screen 610, an email application 123 can provide the ability to swipe or otherwise select a first email. When the user swipes the first email in a first direction, a first set of options 625 can be displayed, as shown in the second screen 620. These options 625 can be email-specific in one example. In another example, at least one of the options 625 is a backend server 140 action that is determined by the hero server 130. The option 625 can alternatively be an option to display a hero card that has actions incorporated into it.

The swiped email can act as the target content. The stages of FIG. 5 can be followed to generate a hero card 210 based on the swiped email. In one example, the JSON returned from the hero server 130 can be utilized to add action buttons for backend servers 140 to the options 625. In this example, the hero server 130 determined that loading to EVERNOTE and SANEBOX were two backend server 140 actions relevant to the swiped email. In another example, EVERNOTE and SANEBOX simply represent that hero cards are available for those systems. When the user selects either one, the full hero card can display.

In another example, swiping the email in a second direction can cause a second option pane 635 to display, as shown on screen 630. In one example, the second option pane 635 can include additional actions specific to the email application or other unassociated backend systems.

Figure 6B:
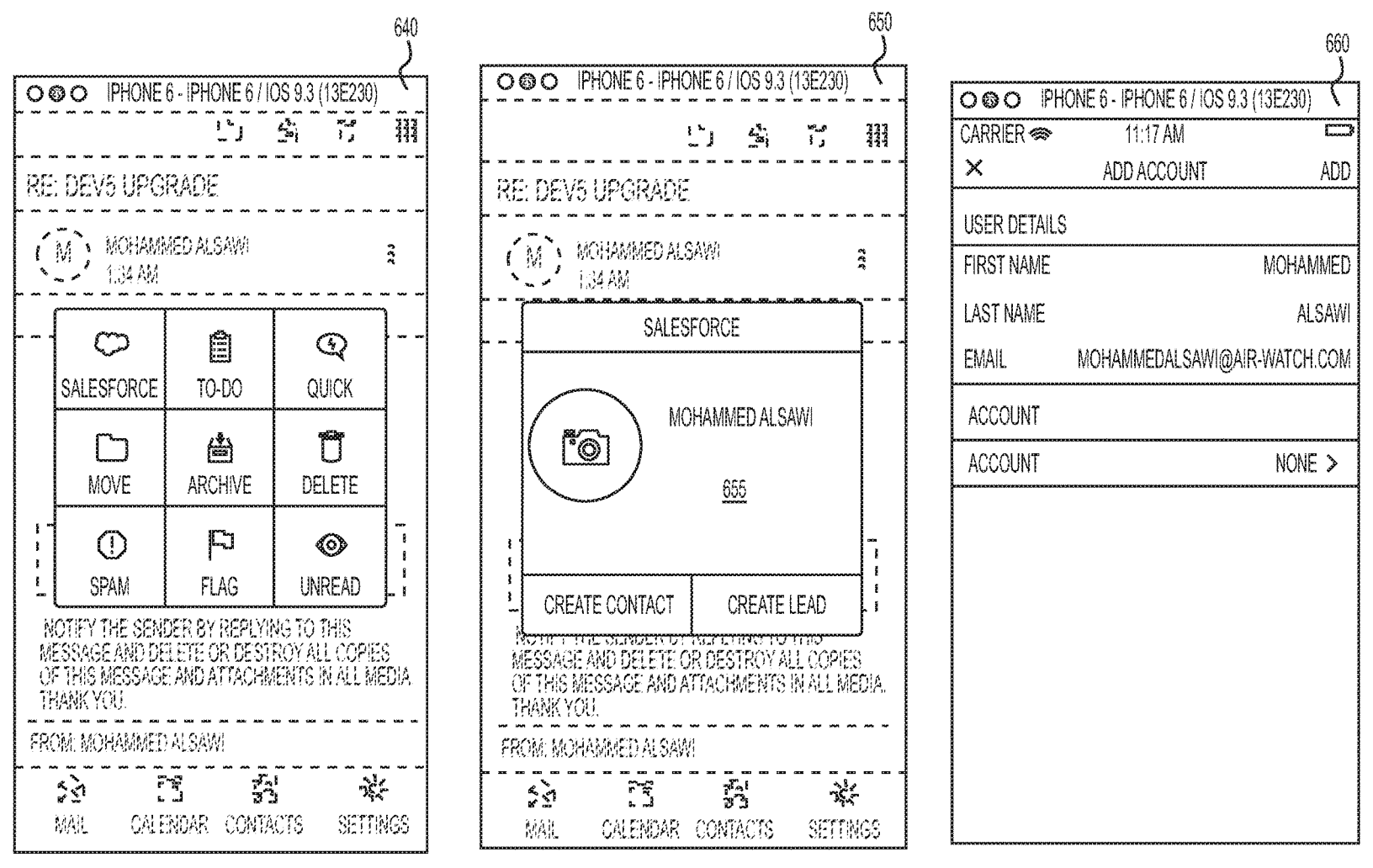

FIG. 6B provides additional GUI examples. Swiping an email in screen 640 has caused the hero server 130 to return a SALESFORCE action. Selecting this action can cause the email application 123 to display the full hero card 655, as shown in screen 650. The hero card 655 includes actions "Create Contact" and "Create Lead." If the user selects either of these, the hero server 130 can make API calls to the SALESFORCE backend server 140 to cause the actions to be carried out there. In one example, additional information might be needed to carry out the action. Screen 660 shows inputs that are provided to allow the user to add the email sender as a contact in SALESFORCE.

Figure 7:
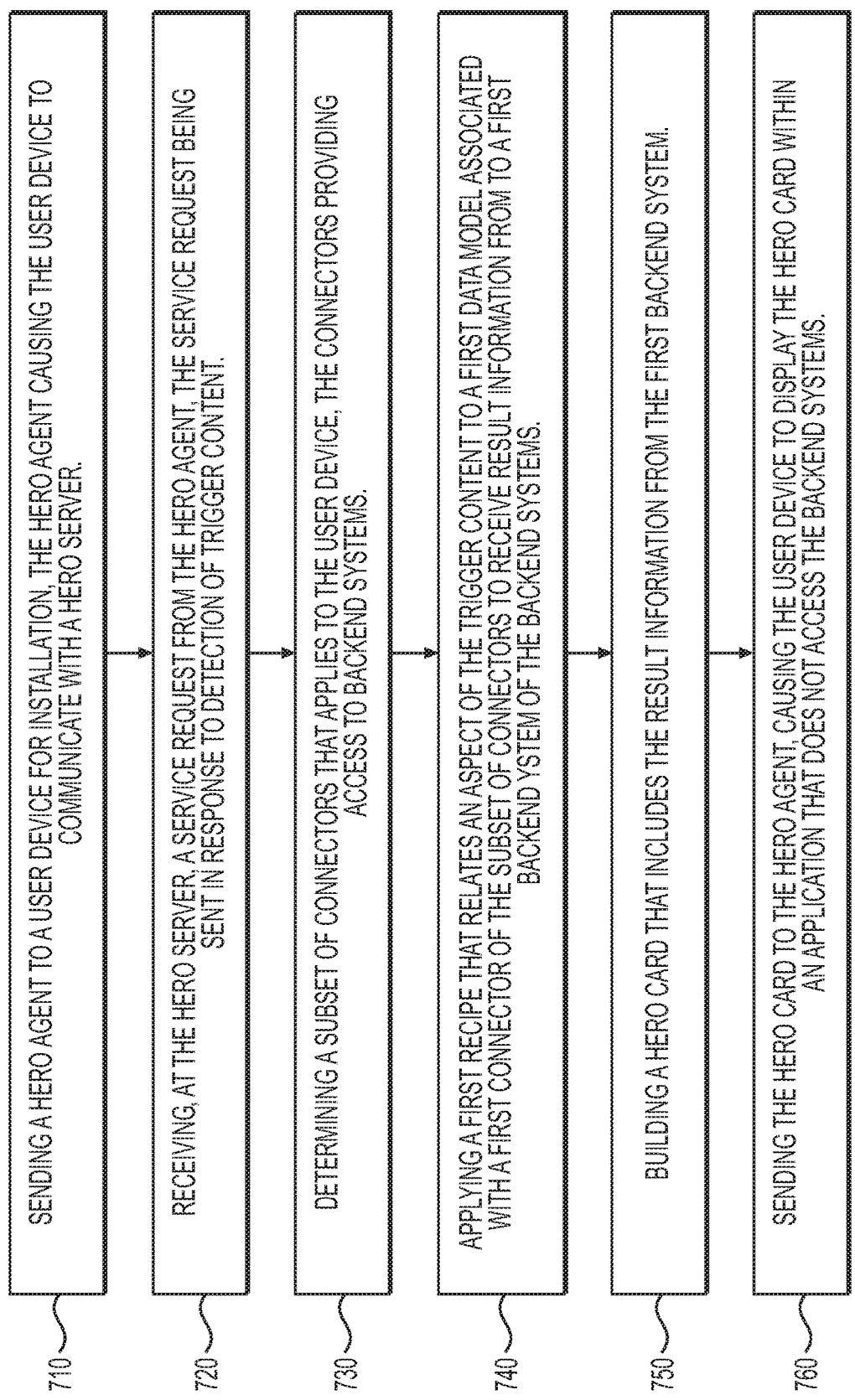
FIG. 7 is an exemplary method executed in a system.

FIG. 7 is an example flow chart. At stage 710, a hero agent 112 can be installed on a user device 110. The hero agent 112 can be installed as part of an application, such as an email application, or separate from an application that will utilize the hero agent 112. The hero agent 112 can be a background process, or can be its own stand-alone application, in an example. The hero agent 112 can cause the user device 110 to communicate with a hero server 130 to retrieve contextual information. The contextual information can relate to content received in an application that executes on the user device 110. In one example, the hero agent 112 communicates with the application through API procedure calls between the application and the hero agent 112.

At stage 720, the hero server 130 can receive a service request from the hero agent 112. The service request can be sent in response to the detection of trigger content within an application. Trigger content can be any content that the hero agent 112 recognizes as having an attribute that is useable at the hero server 130 for finding related information in backend servers 140. The service request can include an authentication credential, such as a token, that allows the hero server 130 to validate the user and the request.

The hero server 130 can utilize the service request to identify contextual information for use in at least one hero card 210. The contextual information can include related information from outside of the application associated with the triggering event. For example, if an email application triggers the service request, the contextual information can come from backend systems 140 that the email application does not otherwise communicate with.

Identifying a group associated with the user, such as a tenant, can allow the hero server 130 to determine which backend systems 140 to connect with. At stage 730, the hero server 130 can determine a subset of connectors including a first connector that applies to the user device, the connectors providing access to backend systems 140 that are not accessible by the application. The backend system 140 can be one or more servers or databases used by one or more other applications. The hero server 130 can create a relational bridge between these different systems.

At stage 740, the hero server 130 can perform a search at the identified backend system 140 based on metadata from the target content. This can include applying a first recipe associated with the first connector, the first recipe relating an aspect of the trigger content to a first backend system having a first data model. In response to applying the first recipe, the hero server 130 can receive result information from the first backend system.

At stage 750, the hero server 130 can assemble a hero card 210 that includes the result information from the first backend system. This can include action information that forms the basis of action buttons on the hero card 210. The hero card 210 can include a data structure for formatting the different information for display. The data structure can include different regions, such as for icons, information, and action buttons.

At stage 760, the hero server 130 sends the hero card to the hero agent, causing the user device to display the hero card within the application. The application displaying the hero card 210 can graphically format the information based on reading the hero card 210 data structure and implementing the display of the hero card 210 within the application. The application can choose to minimize or abbreviate portions of the hero card 210 based on available screen space. For example, some regions can be hidden, minimized, or maximized, depending on the application. A hero plugin can execute within the application to assist with managing the display of hero cards 210 within the application.

Although the examples described involve a hero agent 112 contacting a hero card server 130 with metadata used to identify and build hero cards, in another example, the content for a hero card can be provided along with the email. In this example, a server, such as a separate email server, the hero server 130, or a MICROSOFT EXCHANGE SERVER, can identify metadata for incoming messages and determine the content for hero cards prior to or concurrent with delivery of the email to email app 123. In addition, although illustrated as a separate server, hero server 130 can be part of the email server or integrated with the email server. Similar functionality described with respect to the hero agent 112 can be implemented at the server. The server can implement templates to identify trigger content. The server can then check backend systems 140 that are resident at the server or remote from the server. The server can do so by communicating with connectors that are part of the server or external from the server. The connectors can dictate recipes for interacting with the backend systems 140.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A non-transitory, computer-readable medium containing instructions executed by at least one processor to perform stages for generating hero cards, the stages comprising:
   receiving an email within an email application of a user device, the email application being unassociated with a plurality of backend systems;
   detecting trigger content within the email by a hero agent of the user device;
   sending, by the hero agent, a service request for hero content to a hero server, the service request including the trigger content and authentication tokens associated with the user device to be used by the hero server to determine a subset of backend systems, from the plurality of backend systems, that relate to both the trigger content and at least one of the authentication tokens;
   receiving the hero content related to the email, wherein the hero content is not part of the email as originally sent;
   displaying a first hero card within a graphical user interface (GUI) of the email application, wherein the first hero card includes at least a portion of the hero content and an action button for performing a function in the backend systems related to both the trigger content and at least one of the authentication tokens.

2. The non-transitory, computer-readable medium of claim 1, wherein the hero content is received prior to, or concurrent with, delivery of the email to the email application.

3. The non-transitory, computer-readable medium of claim 1, wherein the stages further comprise:
   defining a region for displaying hero cards within the GUI of the email application; and
   cycling through multiple hero cards in the region, wherein a second hero card displayed in the region includes different hero content than the first hero card, the different hero content being related to a second email received by the email application.

4. The non-transitory, computer-readable medium of claim 1, wherein the stages further comprise:
   receiving a swipe gesture associated with the email on the GUI; and
   displaying an action associated with the hero content as a result of the swipe.

5. The non-transitory, computer-readable medium of claim 1, wherein the action button causes an action to be carried out by an application other than the email application.

6. The non-transitory, computer-readable medium of claim 1, wherein the stages further comprise:

receiving selection of a second email within the GUI of the email application;
requesting additional hero content related to the second email; and
displaying a second hero card in place of the first hero card based on the selection.

7. The non-transitory, computer-readable medium of claim 1, wherein displaying the first hero card includes determining at least one region to display from amongst at least a header region, an information region, and an action region, wherein the determination is based on the hero content received.

8. A system for providing hero cards, the system comprising:
a non-transitory, computer-readable medium that contains instructions;
a processor that executes the instructions to perform stages including:
receiving an email within an email application of a user device, the email application being unassociated with a plurality of backend systems;
detecting trigger content within the email by a hero agent of the user device;
sending, by the hero agent, a service request for hero content to a hero server, the service request including the trigger content and authentication tokens associated with the user device to be used by the hero server to determine a subset of backend systems, from the plurality of backend systems, that relate to both the trigger content and at least one of the authentication tokens;
receiving the hero content related to the email before or concurrently with the email, wherein the hero content is not part of the email as originally sent;
displaying a first hero card within a graphical user interface (GUI) of the email application, wherein the first hero card includes the hero content and an action button for performing a function in the backend systems related to both the trigger content and at least one of the authentication tokens.

9. The system of claim 8, the stages further comprising:
receiving selection of the email within the GUI of the email application; and
displaying the hero content as a result of the selection.

10. The system of claim 8, wherein the stages further comprise:
defining a region for displaying hero cards within the GUI of the email application; and
cycling through multiple hero cards in the region, wherein a second hero card displayed in the region includes different hero content than the first hero card, the different hero content being related to a second email.

11. The system of claim 8, wherein the stages further comprise:
receiving a swipe of the email on the GUI; and
displaying an action associated with the hero content as a result of the swipe.

12. The system of claim 8, wherein the action button causes an action to be carried out by an application other than the email application.

13. The system of claim 8, wherein the stages further comprise:
receiving selection of a second email within the GUI of the email application;
requesting additional hero content related to the second email; and
displaying a second hero card in place of the first hero card based on the selection.

14. The system of claim 8, wherein displaying the first hero card includes determining which regions to display from amongst at least a header region, an information region, and an action region, wherein the determination is based on the hero content received.

15. A method for presenting backend content within an application using hero cards, comprising:
receiving an email within an email application of a user device, the email application being unassociated with a plurality of backend systems;
detecting trigger content within the email by a hero agent of the user device;
sending, by the hero agent, a service request for hero content to a hero server, the service request including the trigger content and authentication tokens to be used by the hero server to determine a subset of backend systems, from the plurality of backend systems, that relate to both the trigger content and at least one of the authentication tokens;
receiving the hero content prior to or concurrent with delivery of the email to the email application, wherein the hero content is not part of the email as originally sent;
displaying a first hero card within a graphical user interface (GUI) of the email application, wherein the first hero card includes the hero content and action button for performing a function in the backend systems related to both the trigger content and at least one of the authentication tokens.

16. The method of claim 15, further comprising:
receiving selection of the email within the GUI of the email application; and
displaying the hero content as a result of the selection.

17. The method of claim 15, further comprising:
defining a region for displaying hero cards within the GUI of the email application; and
cycling through multiple hero cards in the region, wherein a second hero card displayed in the region includes different hero content than the first hero card, the different hero content being related to a second email.

18. The method of claim 15, further comprising:
receiving a swipe of the email on the GUI; and
displaying an action associated with the hero content as a result of the swipe.

19. The method of claim 15, wherein the action button causes an action to be carried out by an application other than the email application.

20. The method of claim 15, further comprising:
receiving selection of a second email within the GUI of the email application;
requesting additional hero content related to the second email; and
displaying a second hero card in place of the first hero card based on the selection.

* * * * *